Dec. 6, 1927.　　　　　　　　　　　　　　　　　1,652,079
H. G. WESTERMAN
ADJUSTABLE EXPANSION FLOWERPOT STAND
Filed Dec. 4, 1925　　　　2 Sheets-Sheet 2
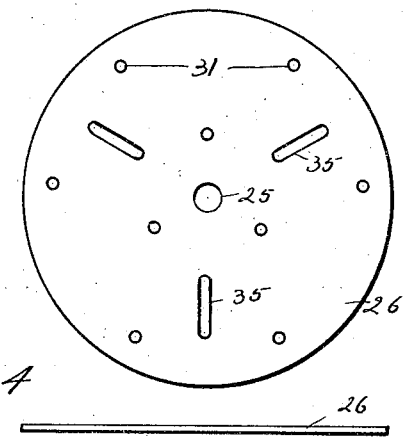
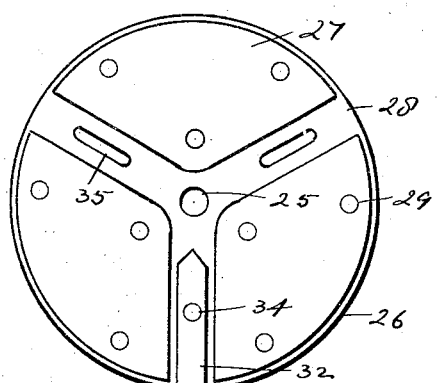
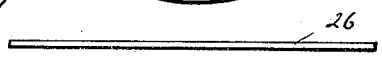
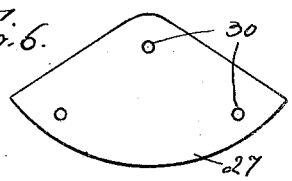
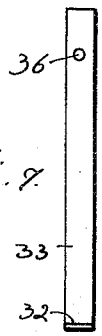
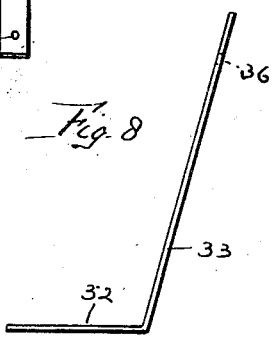
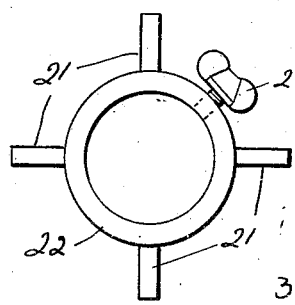
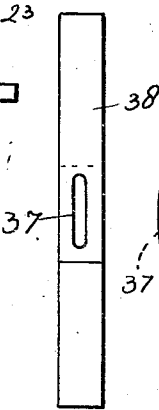
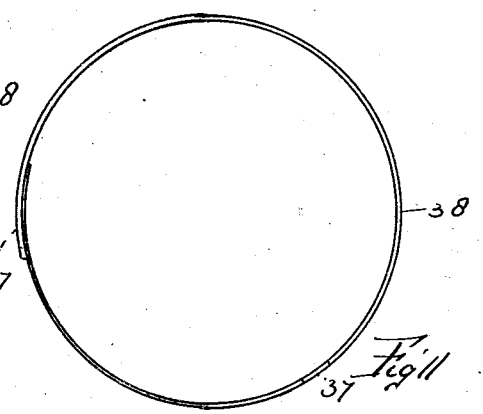
INVENTOR
Harry G. Westerman
By W. W. Williamson, Atty.

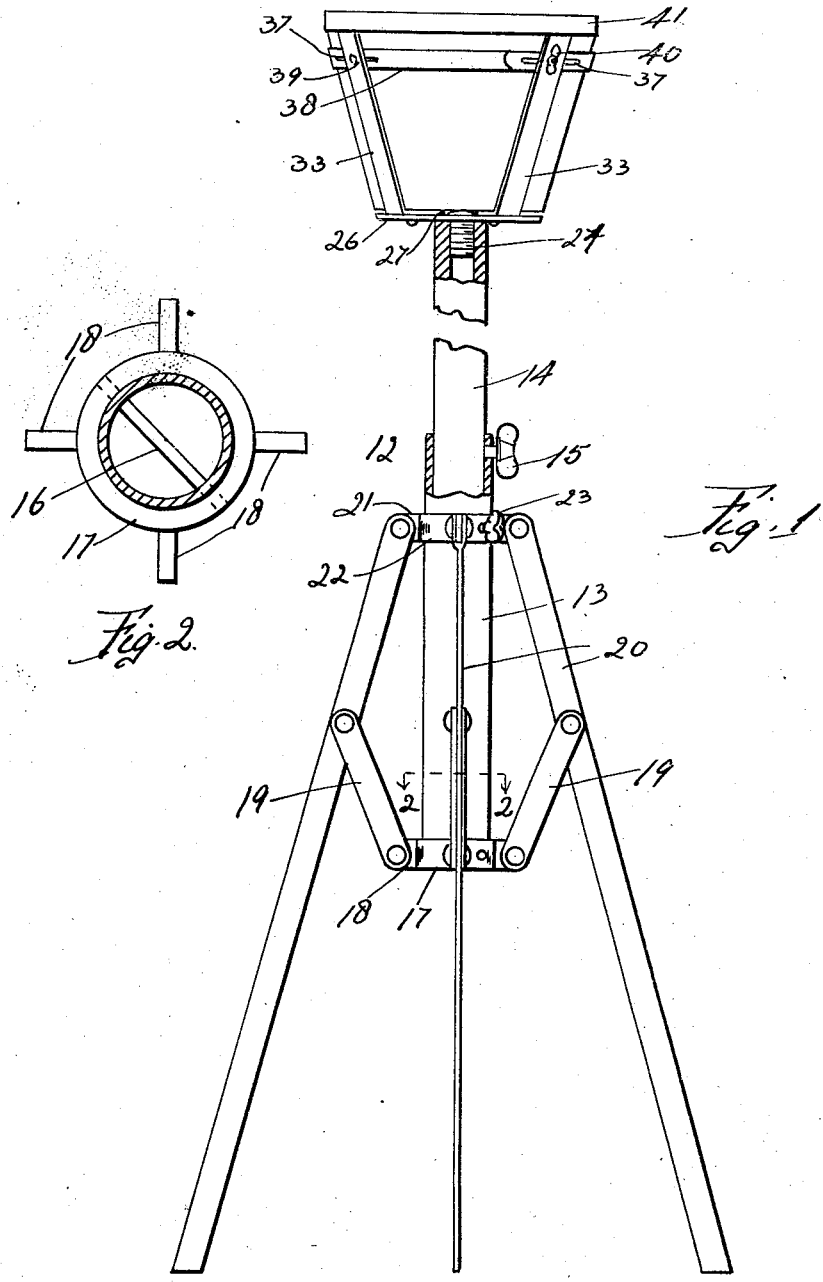

Patented Dec. 6, 1927.

1,652,079

UNITED STATES PATENT OFFICE.

HARRY G. WESTERMAN, OF PHILADELPHIA, PENNSYLVANIA.

ADJUSTABLE EXPANSION FLOWERPOT STAND.

Application filed December 4, 1925. Serial No. 73,138.

My invention relates to new and useful improvements in an adjustable expansion flower pot stand, and has for its object to provide an exceedingly simple and effective device of this character which may be readily and quickly adjusted for the reception of different sized flower pots, also raised or lowered to different heights and the legs moved in or out to change the distances between the bearing points of the legs.

Another object of this invention is the provision of a unique flower pot holding structure.

A further object of the invention is to provide a telescoping standard having legs adjustably connected with one of the sections of said standard, and an adjustable flower pot holder detachably connected with the other section of the standard.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:

Fig. 1, is a side elevation of an adjustable expansion flower pot stand embodying my invention, but with portions broken away and shown in section to illustrate details of construction.

Fig. 2, is an enlarged sectional view at the line 2—2 of Fig. 1, with the legs and links removed.

Fig. 3, is a plan or face view of the flower pot rest.

Fig. 4, is an edge view thereof.

Fig. 5, is a plan view of the flower pot rest and associated segmental plates to form grooves for the flower pot holder ribs (one of which is shown).

Fig. 6, is a face view of one of the segmental plates.

Fig. 7, is a face view of one of the flower pot holder ribs.

Fig. 8, is an edge view thereof.

Fig. 9, is a plan view of the adjustable sleeve.

Fig. 10, is a side elevation of the adjustable ring, forming a part of the flower pot holder.

Fig. 11, is an edge view thereof.

In carrying out my invention as herein embodied, 12 represents a collapsible or telescoping standard including a tubular body or lower section 13 and a sliding upper section 14 which is slidably, telescopically mounted within the lower section 13, and may be held in different adjustable positions relative to the section 13 by means of a thumb screw 15, having threaded connection with the section 13 adjacent its upper end and passing entirely therethru so as to impinge on the outer surface of the section 14. The outer section 14 should be slightly longer than the section 13 so that when section 14 has been moved to its lowermost position its upper end will still extend a considerable distance above the upper end of the section 13, but in order to limit the downward or inward movement of the section 14, a long rivet 16 extends across the interior of the section 13 at its lower end and said rivet is also utilized for holding the collar 17 on the lower end of the section 13 of the standard. The collar 17 is provided with outwardly projecting radial lugs 18, to which are pivoted the inner ends of the links 19, while the outer ends of the latter are pivoted to the legs 20, which have their upper ends pivoted to outwardly projecting radial lugs 21 on the sleeve 22, which is slidably mounted on the standard section 13, and is held in different adjustable positions by means of a thumb screw 23 having threaded connection with the sleeve and passing into entirely therethru, so as to impinge on the outer surface of the standard section 13.

The upper end of the standard section 14 is internally threaded to receive a screw 24, which passes thru the central aperture 25 in the flower pot rest 26, which latter is preferably in the form of a metal disc. On one face of the flower pot rest 26 are superimposed a plurality of segmental plates 27 so fastened that their adjacent edges are spaced apart and provide grooves 28 radiating from the center of the flower pot rest. These plates 27 are held in place by rivets 29, which pass thru holes 30 in the segmental plates and thru holes 31 in the flower pot rest.

In the grooves 28 are slidably mounted the inturned ends 32 of the ribs 33 and longitudinal slots by means of rivets 34 or their equivalents which project thru radial slots 35 in the flower pot rest 26 within the confines of the grooves 28, said inturned ends of the ribs being prevented from swinging from side to side to any great extent by coaction with the straight edges of the segmental plates.

In the upper outer ends of the ribs 33 are formed holes 36 for the reception of suitably securing devices which pass thru said holes and thru slots 37 in the expansible ring 38. The ring is preferably attached to one or two of the ribs where said meeting ends overlap by a bolt or butterfly nut 40.

From the foregoing description it will be particularly noted that a flower pot 41, urn of jardinière may be seated upon the flower pot rest and the ring 38 and ribs 33 then drawn inward by releasing the butterfly nut 40 and either pulling upon the meeting overlapping ends of the ring or by pushing inward on the ribs, and in either case, contraction of the ring 38 will be permitted because of the slots 37, and after the proper adjustment has been obtained the butterfly nut 40 may be tightened to maintain the adjustment.

By moving the sleeve 23 up or down on the standard, the legs 20 may be adjusted so as to provide the desired space between the bearing ends of said legs according to the height, weight or spread of the plant in the flower pot, and by screwing the thumb screw 23 inward until it impinges on the section 13 of the standard, said legs may be held in their adjustment. To raise or lower the flower pot holder to accommodate it to surrounding conditions, the section 14 of the standard may be moved in or out of the section 13 and the adjustment desired maintained by screwing the thumb screw 15 inward until it impinges on the section 14 of the standard.

Of course, I do not wish to be limited to the exact details of construction as herein shown as these may be varied within the limits of the appended claim without departing from the spirit of my invention.

Having thus fully described my invention, what I claim as new and useful is:

A stand of the class described comprising a telescoping standard, adjustable legs connected with the lower portion of said standard and a flower pot holder detachably connected with the upper end of said standard, said flower pot holder including a flower pot rest, segmental plates secured to said rest with their adjacent edges in spaced relation to provide grooves, ribs having portions projecting into said grooves, means carried by said ribs and coacting with slots in the region of the grooves for adjustably mounting said ribs on the rest, and a ring connected with said ribs and having overlapping ends to provide for adjustment when the ribs are moved longitudinally of their grooves.

In testimony whereof, I have hereunto affixed my signature.

HARRY G. WESTERMAN.